March 18, 1952  J. T. McNANEY  2,589,721
VOLTAGE INDICATING SYSTEM
Original Filed June 8, 1945

Inventor

JOSEPH T. McNANEY

By Robert T. Killman
Attorney

Patented Mar. 18, 1952

2,589,721

UNITED STATES PATENT OFFICE 2,589,721

VOLTAGE INDICATING SYSTEM

Joseph T. McNaney, Baltimore, Md., assignor to Bendix Aviation Corporation, Towson, Md., a corporation of Delaware Original application June 28, 1945, Serial No. 601,952. Divided and this application June 23, 1949, Serial No. 100,910

3 Claims. (Cl. 171—95)

1

This invention relates to a phase and amplitude sensitive voltage indicating means.

This application is a division of my application Serial No. 601,952, filed June 28, 1945, now Patent No. 2,518,161, issued August 8, 1950 for Follow-up System Stabilizing Circuit, and is being filed in lieu of abandoned applicaton Serial No. 679,623, filed June 27, 1946.

It is desirable in follow-up systems, such as those described in my parent application identified above, to provide some means for indicating lack of correspondence between the controlling device and the controlled load. When the apparatus is first placed in service after an inoperative period, there may be no correspondence in the position of these two devices, so that a very large displacement voltage appears. When in normal use, however, these two devices are generally substantially in synchronism and displacement voltage falls to a very low value, becoming zero when coincidence is perfect. It is desirable to meter this small residual displacement voltage, conveniently referred to as an "error voltage," and this necessitates an indicating device quite sensitive to small voltages but yet not subject to damage by the higher potentials existing at the moment the apparatus is placed in service.

It is accordingly an object of the invention to provide a voltage indicating means which is highly sensitive to small potentials and relatively insensitive to larger potentials.

It is another object of the invention to provide phase and amplitude sensitive voltage indicating means of the balance type having a limited deflection characteristic.

Figure 1:
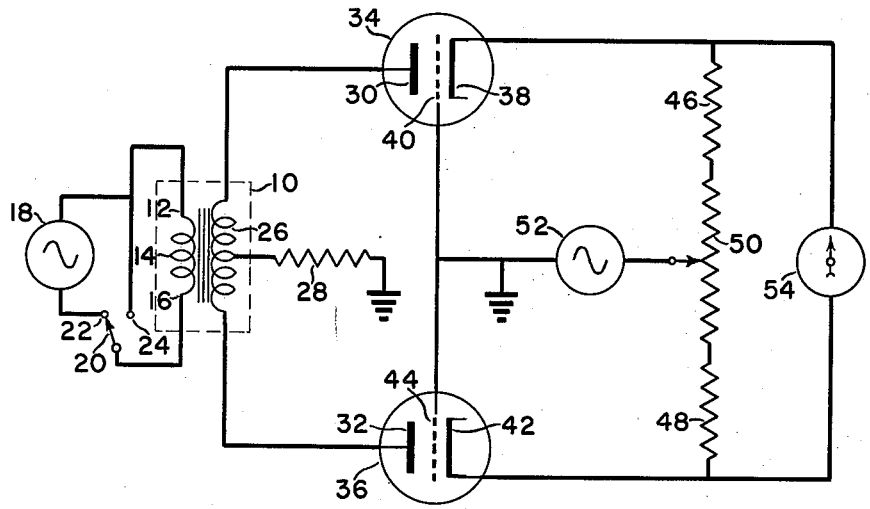
Figure 2:
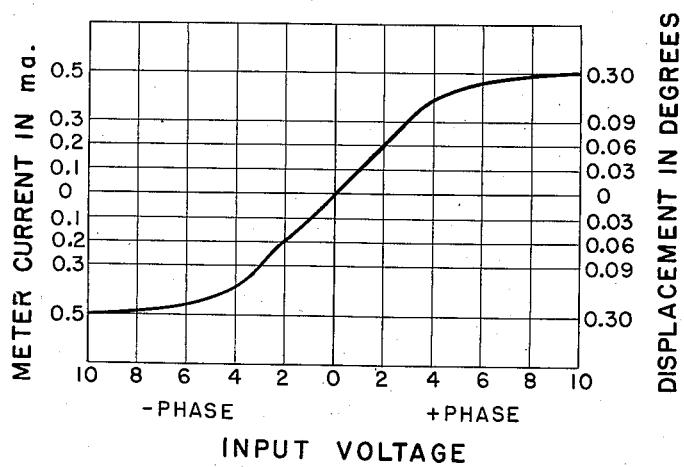

Other objects and advantages of the invention will become apparent from a consideration of the following specification when taken in connection with the accompanying drawing, in which:

Fig. 1 is a schematic diagram of a voltage indicating system embodying the invention, and Fig. 2 is a graph illustrating the deflection characteristic of the indicating system of Fig. 1 as a function of the error voltage amplitude and phase.

The objects and advantages of the invention are attained by means of a balance circuit including a pair of electric discharge devices having a substantially constant alternating potential applied to one set of electrodes each adjacent to a respective emitting cathode and the potential under measurement supplied in outphased relation to anodes situated on the side of said first mentioned electrodes remote from said cathodes.

2

Referring now more particularly to the drawing, there is shown in Fig. 1, a voltage indicating system having an input transformer 10, one terminal 12 of the primary 14 of which is connected to one terminal of a source 18 of a variable amplitude alternating potential. The remaining terminal 16 of the primary 14 is connected to a movable contact 20 of a single pole, double throw switch having fixed contacts 22 and 24. Contact 24 is connected to terminal 12 of the primary 14, while terminal 22 is connected to the remaining terminal of source 18. Hence when movable contact 20 engages contact 22 the primary 14 is connected directly across the source 18 and when movable contact 20 engages the contact 24, the primary is short-circuited upon itself for a purpose to be later apparent.

The transformer 10 has a center tapped secondary 26, the end terminals of which are connected respectively to anodes 30 and 32 of triodes 34 and 36, and the center tap of which is connected to ground through a resistor 28, which is rather high in value, for example, three megohms. The end terminals of secondary 26 therefore develop voltages which are in phase opposition and symmetrical with respect to ground, which are applied to the anodes 30 and 32 of the triodes 34 and 36. An emissive cathode 38 and an intermediate cold grid electrode 40 are associated with anode 30 and another emissive cathode 42 and intermediate cold grid electrode 44 are associated with anode 32. The intermediate electrodes 40 and 44 may be connected to ground as shown, while the cathodes 38 and 42 are respectively connected through resistors 46 and 48 to the end terminals of a potentiometer 50 whose movable tap is connected to a terminal of a source 52 of alternating potential. The remaining terminal of source 52 is grounded. The potential of source 52 is of fixed frequency identical with that of the source 18 and of constant amplitude. The source 52 is employed in this system as a source of reference potential and where the invention is employed in connection with a remote control or follow-up system such as disclosed in my parent application above identified, the source 52 may be the power source of the control system. It also acts as a source of current for the bridge network consisting of the resistance between grid 40 and cathode 38, the resistance between grid 44 and cathode 42, and resistors 46, 48 and 50, in proper phase relationship with source 18. When so employed source 18 represents the error voltage generated by lack of coincidence between the controlling and the controlled mechanisms. In that case, the voltage of source 18 will either be in phase with that of source 52 or substantially 180° out of phase therewith. The relative phase of the two voltages will be an indication of the sense of the positional error and the amplitude of the voltage of the source 18 will be proportional to the magnitude of the positional error. An indicating meter 54, which may be of the zero center type, is connected between cathodes 38 and 42.

The voltage of source 52 is thus impressed in the same phase between the electrodes 40 and 44 and the cathodes 38 and 42. In initially adjusting the apparatus, the movable contact of switch 20 is placed in engagement with contact 24, short-circuiting the primary 14 of the transformer 10, and the tap on potentiometer 50 is adjusted for zero deflection of the meter 54. This is possible because of the similar parallel paths presented to the current flowing from the source 52 through the two grid-cathode space discharge paths of the triodes 34 and 36. A movable contact 20 of the single pole, double throw switch is now moved to a position engaging contact 22, thus connecting primary 14 across the source 18.

If it now be assumed that the phase of the voltage of source 18 is such that anode 30 becomes negative at the time when grid electrode 40 becomes positive with respect to cathode 38, the electric field produced by anode 30 penetrates the mesh of grid 40 diminishing the electron flow thereto. The converse effect is produced to cathode 42, an increasing current at this point resulting. Since the current flow in resistor 46 is now less than that in resistor 48, the previously balanced system becomes unbalanced, impressing a voltage across the indicating meter 54 showing that displacement is present and indicating its sense. A reversal in phase of the voltage of displacement source 18 will result in a reversal of the deflection sense of the indicator 54. It is apparent that when the voltage on either anode swings negative at the time when its associated grid electrode is driven positive, it can do no more than reduce the previously flowing current to zero, thus setting a limit to change in this direction. In the converse sense, at the moment the anode begins to draw current, substantially the full output voltage of the transformer appears across the resistor 28, decreasing the anode voltage and thus setting an upper limit of current variation which may be secured. A typical deflection characteristic for the meter 54, in terms of input voltage, is shown in Fig. 2, the maximum and minimum limits of deflection appearing clearly. It is obvious that in the foregoing analysis only events occurring at such periods as the electrodes 40 and 44 are positive with respect to their associated cathodes need be considered, since when these electrodes are negative, no current will flow to them and the current flowing in the anode circuit is negligible, by virtue of the high resistance 28. Further, the effect of negative voltage on these electrodes 40 and 44 will be to cut off completely all anode current flow.

There has been described a voltage indicating system particularly adapted to the indication of the displacement voltage of a remote control or follow-up system such as that disclosed in the above identified parent application. The described indicating system affords high sensitivity in the low signal region with diminishing sensitivity in the presence of large displacement signals, thus protecting itself against the effects of high voltages. An important advantage of the circuit is that currents from source 18 are indicated, in the manner described, by the meter 54, but are substantially isolated from the meter 54 and associated circuits by the high resistance 28. Since currents from source 18 are substantially isolated from the indicator bridge network, when an anode, for example anode 30, is made increasingly positive with respect to a positive grid 40, grid-cathode current flow reaches saturation more sharply and with better linearity. This is in contrast to the non-linear effect imposed on the plate current flow in a conventional circuit when the control grid input voltage exceeds the normal grid bias.

While the indicating system has been described with particular reference to the remote control or follow-up system disclosed in the parent application, it should be understood that it is not restricted to such use but may be effectively employed where ever the need arises for a voltage indicating system having those characteristics.

What is claimed is:

1. In a voltage responsive indicating device, a pair of vacuum tubes each having a cathode, an anode and an intermediate grid electrode positioned therebetween, a transformer having a center-tapped secondary, said transformer being coupled to a variable amplitude signal source of predetermined frequency, means impressing a substantially constant voltage of said predetermined frequency in the same phase between said cathode and said grid electrode of each of said tubes, means connecting the terminals of said secondary winding to said anodes, indicating means responsive to the magnitude and sense of the difference in current flowing at said cathodes and a resistor connected between said center-tap of said secondary and a point on said circuit between said cathode and grid electrodes, the resistance of said resistor being of sufficient value to severely limit the current flowing in said secondary whereby the current flowing through said indicating means cannot substantially exceed the magnitude of the current flowing between said cathodes and said grid electrodes.

2. In a voltage responsive indicating device, a pair of vacuum tubes each having a cathode, an anode and an intermediate grid electrode positioned therebetween, a transformer having a center-tapped secondary coupled to a variable amplitude signal source of predetermined frequency, means impressing a substantially constant voltage of said predetermined frequency in the same phase between said cathode and said grid electrode of each of said tubes, means connecting the end terminals of said secondary winding to said anodes, indicating means responsive to the magnitude and sense of the difference in current flowing at said cathodes, and means common to the anode circuits of said tubes and located between said anodes and the remaining electrodes of said tubes, the last named means presenting an impedance of such magnitude as to severely limit the current flowing in said secondary of said transformer, whereby the current flowing through said indicating means cannot substantially exceed the magnitude of the current flowing between said cathodes and said grid electrodes.

3. In a voltage responsive indicating device a pair of vacuum tubes each having a cathode, an anode and an intermediate grid electrode positioned therebetween, a source of substantially constant voltage of a predetermined frequency, means impressing voltage from said source in the same phase between said cathode and said grid electrode of each of said tubes, the last named means comprising resistance elements of equal values of resistance connected between said source and each of said cathodes, said source being directly connected to said grids, means connecting said grid electrodes to ground, a transformer having a center tapped secondary, said transformer being coupled to a variable amplitude signal source of said predetermined frequency, means connecting the end terminals of said secondary winding to said anodes, a resistor connected between said center tap of said secondary and ground, and an indicator responsive to the magnitude and direction of current flow therethrough connected across said resistance elements, the resistance of said resistor being of sufficient value to severely limit the current flowing in said secondary whereby the current flowing through said indicator cannot substantially exceed the magnitude of the current flowing between said cathodes and said grid electrodes.

JOSEPH T. McNANEY.

REFERENCES CITED

The following references are of record in the file of this patent:

UNITED STATES PATENTS

| Number | Name | Date |
| --- | --- | --- |
| 1,938,136 | Crew | Dec. 5, 1933 |
| 2,267,184 | Bagno | Dec. 23, 1941 |
| 2,434,822 | Van Beuren et al. | Jan. 20, 1948 |